(12) United States Patent
Sha et al.

(10) Patent No.: US 12,494,055 B2
(45) Date of Patent: Dec. 9, 2025

(54) PERCEPTION ANOMALY DETECTION FOR AUTONOMOUS DRIVING

(71) Applicant: TuSimple, Inc., San Diego, CA (US)

(72) Inventors: Long Sha, San Diego, CA (US);
Junliang Zhang, San Diego, CA (US);
Rundong Ge, San Diego, CA (US);
Xiangchen Zhao, San Diego, CA (US);
Fangjun Zhang, San Diego, CA (US);
Yizhe Zhao, San Diego, CA (US);
Panqu Wang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 113 days.

(21) Appl. No.: 18/518,156

(22) Filed: Nov. 22, 2023

(65) Prior Publication Data

US 2025/0046075 A1    Feb. 6, 2025

Related U.S. Application Data (60) Provisional application No. 63/517,574, filed on Aug. 3, 2023.

(51) Int. Cl.
| | |
|---|---|
| *G06V 10/98* | (2022.01) |
| *B60W 50/02* | (2012.01) |
| *B60W 50/029* | (2012.01) |
| *B60W 60/00* | (2020.01) |
| *G06V 10/26* | (2022.01) |

(Continued)

(52) U.S. Cl.
CPC ......... *G06V 10/98* (2022.01); *B60W 50/0205* (2013.01); *B60W 50/029* (2013.01); *B60W 60/001* (2020.02); *G06V 10/26* (2022.01);

*G06V 10/28* (2022.01); *G06V 10/48* (2022.01); *G06V 10/751* (2022.01); *G06V 20/56* (2022.01);

(Continued)

(58) Field of Classification Search
None
See application file for complete search history.

(56) References Cited

U.S. PATENT DOCUMENTS

| 12,217,519 B2 * | 2/2025 | Ambrus | G06V 10/255 |
|---|---|---|---|
| 2019/0250597 A1 * | 8/2019 | Takama | G05B 19/042 |

(Continued)

FOREIGN PATENT DOCUMENTS

| JP | 7208155 B2 * | 1/2023 | H04L 67/12 |
|---|---|---|---|
| WO | 2019094843 A4 | 5/2019 | |
| WO | WO-2024010669 A1 * | 1/2024 | B60K 35/28 |

OTHER PUBLICATIONS

English translation of JP-7208155-B2, Ameixieira, 2023 (Year: 2023).*

*Primary Examiner* — James M Hannett
(74) *Attorney, Agent, or Firm* — Perkins Coie LLP (57) ABSTRACT

A unified framework for detecting perception anomalies in autonomous driving systems is described. The perception anomaly detection framework takes an input image from a camera in or on a vehicle and identifies anomalies as belonging to one of three categories. Lens anomalies are associated with poor sensor conditions, such as water, dirt, or overexposure. Environment anomalies are associated with unfamiliar changes to an environment. Finally, object anomalies are associated with unknown objects. After perception anomalies are detected, the results are sent downstream to cause a behavior change of the vehicle.

20 Claims, 4 Drawing Sheets

(51) Int. Cl.
*G06V 10/28* (2022.01)
*G06V 10/48* (2022.01)
*G06V 10/75* (2022.01)
*G06V 20/56* (2022.01)

(52) U.S. Cl.
CPC .............. *B60W 2050/021* (2013.01); *B60W 2050/0215* (2013.01); *B60W 2050/0292* (2013.01)

(56) References Cited

U.S. PATENT DOCUMENTS

| | | | |
|---|---|---|---|
| 2020/0226430 A1* | 7/2020 | Ahuja | G06F 18/2193 |
| 2021/0117760 A1* | 4/2021 | Krishnan | G06N 3/08 |
| 2023/0176577 A1* | 6/2023 | Ditty | G06V 20/588 |
| | | | 701/23 |
| 2024/0249118 A1* | 7/2024 | Benkert | G06N 3/08 |
| 2024/0249530 A1* | 7/2024 | Ravi Kumar | G06V 10/421 |

* cited by examiner

PERCEPTION ANOMALY DETECTION FOR AUTONOMOUS DRIVING

CROSS-REFERENCE TO RELATED APPLICATIONS

This patent application claims priority to and the benefit of U.S. Provisional Application No. 63/517,574, filed on Aug. 3, 2023. The aforementioned application is incorporated herein by reference in its entirety.

TECHNICAL FIELD

This document relates to systems, apparatus, and methods to detect perception anomalies for autonomous driving.

BACKGROUND

Autonomous vehicle navigation is a technology that can allow a vehicle to sense the position and movement of vehicles around an autonomous vehicle and, based on the sensing, control the autonomous vehicle to safely navigate toward a destination. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself.

SUMMARY

This patent document describes systems, apparatus, and methods to detect perception anomalies.

In some aspects, the techniques described herein relate to a computer-implemented method including: receiving, by a computer in a vehicle, an image obtained by a camera of the vehicle; determining a set of features of the image; identifying, based on the set of features, an anomaly associated with the camera; mapping, based on the set of features, a plurality of uncertainty values to the image; and determining, based on the anomaly and the plurality of uncertainty values, a status of the camera.

In some aspects, the techniques described herein relate to a system for autonomous driving including: a camera coupled to a vehicle; a processor; and a memory storing instructions, execution of which by the processor causes the system to: obtain, by the camera, an image; determine a set of features of the image; identify, based on the set of features, an anomaly associated with the camera; map, based on the set of features, a plurality of uncertainty values to the image; and determine, based on the anomaly and the plurality of uncertainty values, a status of the camera.

In some aspects, the techniques described herein relate to a non-transitory computer-readable medium storing instructions, execution of which by a processor of a computing system causes the computing system to: receive an image obtained by a camera of a vehicle; determine a set of features of the image; identify, based on the set of features, a first anomaly associated with the camera; mask at least a portion of the set of features; generate a reconstructed set of features based on the masked portion; and based on a comparison between the set of features and the reconstructed set of features, identify a second anomaly associated with an environment external to the vehicle; identify a third anomaly associated with an object in the image based on a determination that the object is outside a set of predefined categories; and causing the vehicle to perform a driving operation based on the first, the second, or the third anomaly.

In some exemplary aspects, the above-described techniques are embodied in a non-transitory computer readable storage medium comprising code that when executed by a processor, causes the processor to perform the methods described in this patent document.

In yet other exemplary aspects, a device and system that is configured or operable to perform the above-described techniques is disclosed.

The above and other aspects and their implementations are described in greater detail in the drawings, the descriptions, and the claims.

DETAILED DESCRIPTION

Autonomous driving perception systems often employ a variety of sensors to perceive the vehicle's surrounding environment. A better understanding of a vehicle's surrounding environment enables the vehicle to make safer and more accurate decisions regarding traffic regulations, obstacles, and other road users. However, because driving is often unpredictable, a vehicle will encounter widely varying situations, objects, and environments. To this end, it is important that perception systems can quickly and accurately detect a variety of anomalies so the vehicle can adequately react if needed.

However, current systems for anomaly detection are only effective in limited scenarios (e.g., unknown object detection) or rely on a patchwork of disparate approaches, which may result in inconsistent detections. In addition, current anomaly detection systems are often black boxes, which makes it difficult to diagnose errors and improve future results. For example, anomalies may be incorrectly identified even if the model has "high" confidence.

The present technology addresses these issues by implementing a unified framework for detecting anomalies in autonomous driving perception systems. The unified framework broadly classifies anomalies into three categories to enable perception systems to handle a wide range of anomalies.

First, lens anomalies can occur, which results in a camera or sensor capturing a poor-quality image. For example, such as steam, water, mud, or dirt can cover the lens, or an image can be under-exposed or over-exposed. These lens anomalies can lead to blurriness, occlusions, or color distortions, which lead to poor perception performance.

Second, scene or environment anomalies occur when the camera or vehicle moves into an unfamiliar environment. For example, if a perception system is trained using data captured from a highway or rural areas, then the perception system may encounter an anomaly in an urban area. Similarly, a system trained using images of an environment obtained during the summer may encounter a scene or environmental anomaly during the winter when the same environment is covered by snow.

Third, object or instance anomalies, are caused by unknown objects, such as abnormal vehicles, animals, pieces of rubbish, etc. This type of anomaly is the most common anomaly, so it is critical for vehicle perception systems to learn how to react to those unknown objects.

The unified framework enables perception systems to handle all three types of anomalies simultaneously, rather than separately focusing on specific conditions or objects. In addition, the unified framework can be integrated with existing camera perception systems, which improves computational efficiency compared to separate anomaly detection systems. The three categories also provide a framework to precisely capture anomalies that cause misbehaviors, which facilitates appropriate responses and enables fixes to be more easily implemented. For example, anomalies that can be identified by the human eye can be distinguished from anomalies that actually affect driving performance.

Section I provides an overview of the devices and systems located on or in a vehicle, such as an autonomous semi-trailer truck. The devices and systems can be used to perform anomaly detection techniques that are described in Section II of this patent document, where the anomaly detection techniques are performed within a unified framework.

I. Vehicle Driving Ecosystem

Figure 1:
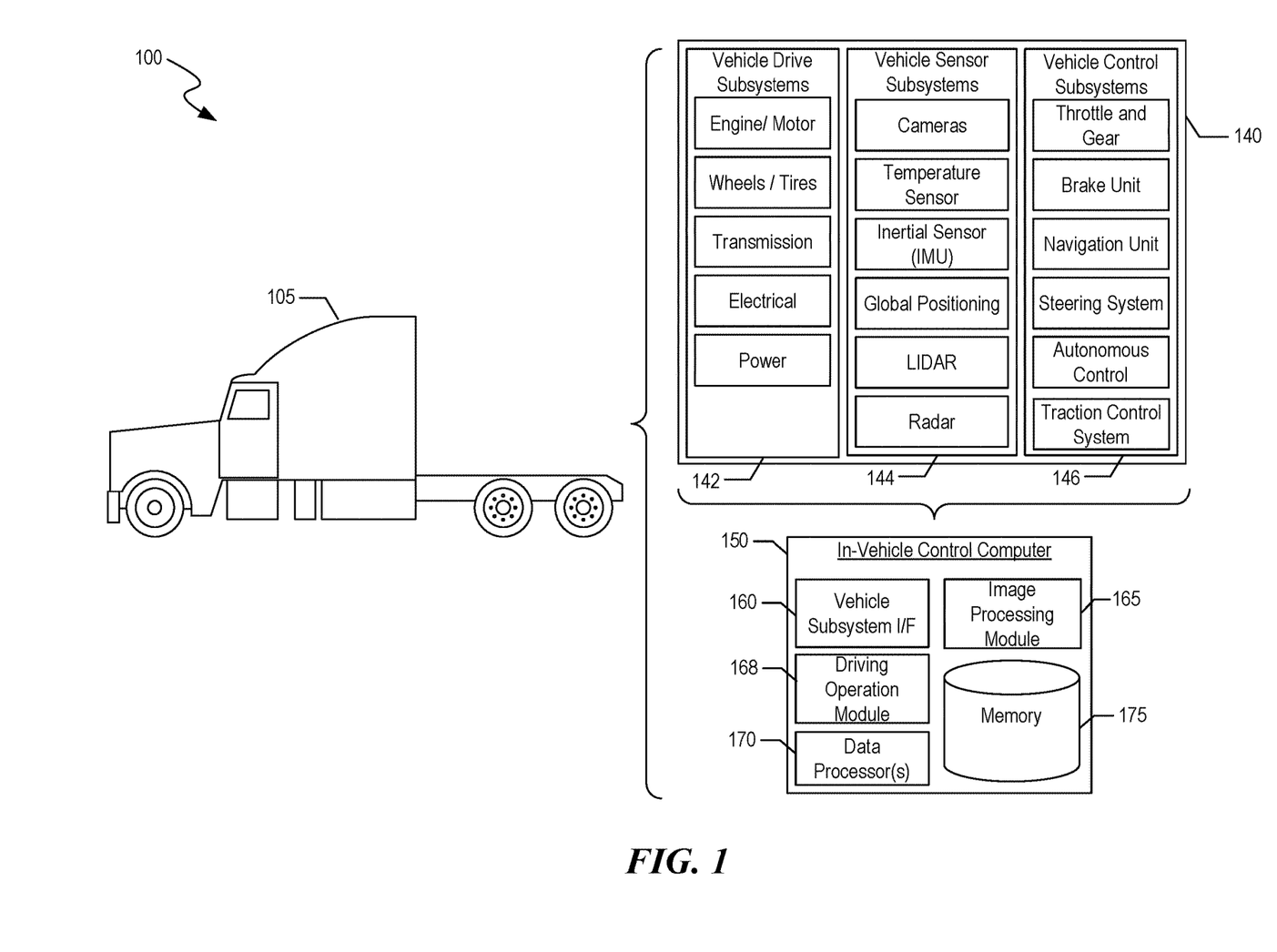
FIG. 1 shows a block diagram of an example vehicle ecosystem in which driving operations can be determined based on anomaly detection performed on images obtained from cameras on or in a vehicle.

FIG. 1 shows a block diagram of an example vehicle ecosystem 100 in which driving operations can be determined based on the image processing performed on images obtained from cameras on or in a vehicle 105. As shown in FIG. 1, the vehicle 105 may be a semi-trailer truck. The vehicle ecosystem 100 includes several systems and components that can generate and/or deliver one or more sources of information/data and related services to the in-vehicle control computer 150 that may be located in the vehicle 105. The in-vehicle control computer 150 can be in data communication with a plurality of vehicle subsystems 140, all of which can be resident in the vehicle 105. A vehicle subsystem interface 160 is provided to facilitate data communication between the in-vehicle control computer 150 and the plurality of vehicle subsystems 140. In some embodiments, the vehicle subsystem interface 160 can include a controller area network (CAN) controller to communicate with devices in the vehicle subsystems 140.

The vehicle 105 may include various vehicle subsystems that support the operation of vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices (e.g., LiDAR or Radar shown in FIG. 1) can be removed. The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment or condition of the vehicle 105. The sensors associated with the vehicle sensor subsystem 144 may be located on or in the vehicle 105. The vehicle sensor subsystem 144 may include a plurality of cameras or image capture devices, one or more temperature sensors, an inertial measurement unit (IMU), a Global Positioning System (GPS) transceiver, a laser range finder/LIDAR unit, a RADAR unit, and/or a wireless communication unit (e.g., a cellular communication transceiver). The vehicle sensor subsystem 144 may also include sensors configured to monitor internal systems of the vehicle 105 (e.g., an $O_2$ monitor, a fuel gauge, an engine oil temperature, etc.,).

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. The plurality of cameras may include one or more devices configured to capture a plurality of images of the environment of the vehicle 105. The cameras may be still image cameras or motion video cameras.

The vehicle control subsystem 146 may be configured to control operation of the vehicle 105 and its components. Accordingly, the vehicle control subsystem 146 may include various elements such as a throttle and gear, a brake unit, a navigation unit, a steering system, and/or an autonomous control unit. The throttle may be configured to control, for instance, the operating speed of the engine and, in turn, control the speed of the vehicle 105. The gear may be configured to control the gear selection of the transmission. The brake unit can include any combination of mechanisms configured to decelerate the vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the GPS transceiver and one or more predetermined maps to determine the driving path for the vehicle 105. The steering system may represent any combination of mechanisms that may be operable to adjust the heading of vehicle 105 in an autonomous mode or a driver-controlled mode.

The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the GPS transceiver, the RADAR, the LIDAR, the cameras, and/or other vehicle subsystems to determine the driving path or trajectory for the vehicle 105.

The traction control system (TCS) may represent a control system configured to prevent the vehicle 105 from swerving or losing control while on the road. For example, TCS may obtain signals from the IMU and the engine torque value to determine whether it should intervene and send instruction to one or more brakes on the vehicle 105 to mitigate the vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and cause a dangerous driving situation. TCS may also be referred to as electronic stability control (ESC) system.

Many or all of the functions of the vehicle 105 can be controlled by the in-vehicle control computer 150. The in-vehicle control computer 150 may include at least one data processor 170 (which can include at least one microprocessor) that executes processing instructions stored in a non-transitory computer-readable medium, such as the memory 175. The in-vehicle control computer 150 may also represent a plurality of computing devices that may serve to control individual components or subsystems of the vehicle 105 in a distributed fashion. In some embodiments, the memory 175 may contain processing instructions (e.g., program logic) executable by the data processor 170 to perform various methods and/or functions of the vehicle 105, including those described for the image processing module 165 and the driving operation module 168 as explained in this patent document. For instance, the data processor 170 executes the operations associated with image processing module 165 for analyzing and/or processing the multiple images obtained from the cameras as described in this patent document. The data processor 170 also executes the operations associated with driving operation module 168 for determining and/or performing driving-related operations of the vehicle 105 based on the information provided by the image processing module 165.

The memory 175 may contain additional instructions, including instructions to transmit data to, receive data from, interact with, or control one or more of the vehicle drive subsystem 142, the vehicle sensor subsystem 144, and the vehicle control subsystem 146. The in-vehicle control computer 150 can be configured to include a data processor 170 and a memory 175. The in-vehicle control computer 150 may control the function of the vehicle 105 based on inputs received from various vehicle subsystems (e.g., the vehicle drive subsystem 142, the vehicle sensor subsystem 144, and the vehicle control subsystem 146).

II. Anomaly Detection Framework

Figure 2:
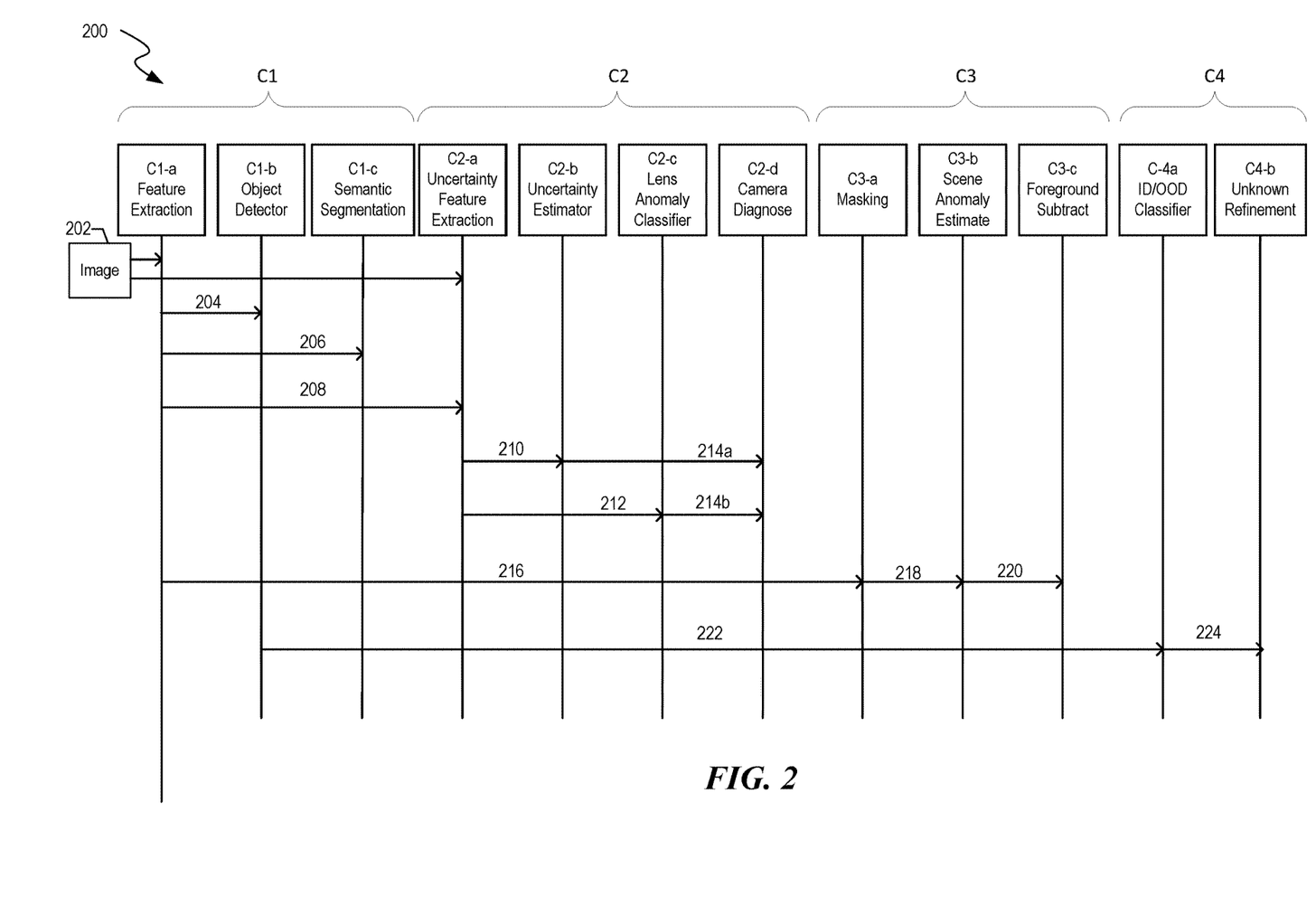
FIG. 2 shows an example process for anomaly detection.

FIG. 2 shows an example process 200 for anomaly detection. The process 200 can generally be performed by the image processing module 165 of FIG. 1. In some embodiments, the anomaly detection process 200 is performed by modules in one or more computers located in the vehicle, as outlined below.

First, an image 202 is received at a camera perception module C1. The image 202 can be produced by a camera, image sensor, LIDAR unit, RADAR unit, or any other suitable sensor, e.g., in the vehicle sensor subsystems 144 of FIG. 1. The camera perception module C1 comprises at least a feature extractor C1-$a$, an object detector C1-$b$, and a semantic segmentation head C1-$c$.

The feature extractor C1-$a$ extracts features from the image 202. For example, a feature can include one or more visual characteristics of an object or environment, such as a type of object (e.g., color, shape, type of vehicle), whether a light is indicated by the object (e.g., taillight on or roof light on), color of the light, etc. In some embodiments, the features are output from the feature extractor C1-$a$ as a feature map. The feature extractor C1-$a$ can use traditional or deep learning techniques, such as neural networks to extract features from the image 202.

The object detector C1-$b$ receives a feature from the feature extractor C1-$a$ at step 204. The object detector C1-$b$ includes a region proposal network (RPN) and detection head and uses the feature map from the feature extractor C1-$a$ to locate an object in the image and classify its category. The RPN generates proposals of objects from the image 202, such as potential foreground objects. The detection head outputs a bounding box, category, or mask for each proposal. If a proposal is not a known object, it is classified as background.

The semantic segmentation head C1-$c$ receives the features extracted by C1-$a$ at step 206. The features are used to output a segmentation map. For example, each pixel of the image can be mapped to one or more classification probabilities that correspond to different categories. For example, given three categories A, B, and C, a pixel can be mapped to 50% category A, 30% category B and 20% category C.

The image 202 is also received at a lens anomaly module C2. The lens anomaly module C2 is configured to detect anomalies in the image 202 that are caused by issues with a sensor lens. Example lens anomalies include mud, water, dirt, or dust on a camera lens. Other example lens anomalies include over-exposure or under-exposure, for instance, caused by direct light or shadows. These lens anomalies can be detected as follows.

At 208, the lens anomaly module C2 includes an uncertainty feature extractor C2-$a$. The uncertainty feature extractor C2-$a$ receives the image 202 in addition to the features from the feature extractor C1-$a$ as input and outputs a feature map for uncertainty estimation. For example, the feature map for uncertainty estimation can be produced using a neural network with a similar architecture as C1-$a$. Unlike C1-$a$, the uncertainty feature extractor C2-$a$ is trained to identify features associated with high uncertainty rather than objects.

At 210, an uncertainty estimator C2-$b$ receives the output of the uncertainty feature extractor C2 as input. The uncertainty estimator C2-$b$ determines a classification probability for each pixel, similar to the semantic segmentation performed by C1-$c$. The uncertainty estimator C2-$b$ is trained to predict different classifications than C1-$c$, particularly for areas where the image quality is poor. The discrepancy (denoted "KL-div") between the outputs of C2-$b$ and C1-$c$ are then used as uncertainty scores. In some embodiments, a pixel having a high uncertainty is associated with a low image quality at that pixel, which can then indicate an issue with the lens, e.g., due to dirt, water, or abnormal light exposure. Similarly, a pixel having a lower uncertainty can be associated with a higher image quality.

At 212, the output feature map from the feature extractor C2-$a$ is input to a lens anomaly classifier C2-$c$. The anomaly classifier C2-$c$ sub-module uses the feature map from C2-$a$ to classify the lens anomaly, for example as water blur, mud or dirt occlusions, poor exposure, etc.

A camera diagnosis sub-module C2-$d$ takes the output from C2-$b$ and C2-$c$ as input at 214$a$ and 214$b$, respectively. As previously described, C2-$b$ can output an uncertainty value for each pixel of the image, while C2-$c$ outputs a classification of a lens anomaly. The camera diagnosis sub-module C2-$d$ can then use criteria derived from these inputs to determine a status of the camera that captured the image 202, e.g., health status. For example, criteria can be based on the number of pixels from C2-*b* that have uncertainty values greater than a threshold. The uncertainty values associated with a pixel can be also determined over a period of time. For example, the length of time that a pixel has a greater-than-threshold uncertainty value can also be used as criteria for determining camera status, e.g., N seconds. A health status of the camera can then be determined based on the criteria. For example, if a threshold proportion of pixels have a high uncertainty value for a length of time, then the camera status can be determined as unhealthy. In some embodiments, the threshold proportion of pixels can be 25%, 50%, 75%, etc. If the camera diagnosis sub-module C2-*d* determines that the camera is unhealthy, then an unhealthy flag and anomaly class from the lens anomaly classifier C2-*c* can be sent to downstream modules to trigger a behavior change of the vehicle.

At 216, the feature map from the feature extractor C-*a* is input to an environment anomaly detector C3 (also referred to as a "scene anomaly detector"). The environment anomaly detector C3 is configured to determine anomalies associated with the vehicle's environment. A vehicle can be trained to navigate in various environments, but features of the environment may be different during operation. For example, road work, newly constructed or demolished buildings, or snow cover at a given location will affect how the vehicle perceives the environment, even if the vehicle is trained in the same location.

The environment anomaly detector C3 includes a masked reconstruction sub-module C3-*a*. The masked reconstruction sub-module uses the feature map from the feature extractor C1-*a* and applies a mask to produce a masked map. For example, masking can be applied to random portions of the feature map. The masked reconstruction sub-module C3-*a* implements a machine-learning model (e.g., a neural network) that is trained to reconstruct original maps from masked maps. This machine-learning model is applied to the masked feature map to produce a reconstructed version of the original feature map from C1-*a*, denoted the "reconstructed feature map."

At 218, the reconstructed feature map from C3-*a* is input to a scene anomaly estimator sub-module C3-*b*. The scene anomaly estimator sub-module C3-*b* also receives the original feature map, e.g., from C-1*a* directly or from C3-*a*. The scene anomaly estimator sub-module C3-*b* determines the difference between the original feature map and the reconstructed feature map to produce a scene anomaly map. For example, the two maps can be subtracted from each other to determine a difference for each pixel. Regions of the scene anomaly map with a large difference can be indicative of an anomaly, while regions with relatively little difference are not. The idea is that if a scene/environment is used in training data for the reconstruction model, the reconstructed feature map will be relatively close to the original feature map, e.g., have differences nearer to zero. In contrast, if an observed scene/environment has features not present in the training data, the reconstructed feature map will be quite different in those unknown areas.

At 220, the scene anomaly map from C3-*b* is input to a foreground subtraction submodule C3-*c*. In some cases, foreground objects can result in false identification of anomalies. For example, a passing vehicle can cause the reconstructed feature map to differ from the original feature map, even though the passing vehicle is not an environmental anomaly. Thus foreground subtraction sub-module is configured to remove the highlighted anomaly areas in the scene/anomaly map that belong to a foreground object. This can be accomplished by training a model to identify foreground objects. After foreground objects are removed, the foreground subtraction sub-module returns a final scene anomaly map that is used by downstream modules to trigger a behavior change of the vehicle.

At 222, the output from the object detection sub-module C1-*b* is input to an object anomaly detection module C4 (also referred to as an "instance anomaly detector"). The object anomaly detection module C4 is configured to detect unknown objects, such as objects that are not identified in training data.

The object anomaly detection module C4 includes an in-distribution/out-of-distribution classifier sub-module C4-*a* ("ID/OOD classifier sub-module"). The ID/OOD classifier C4-*a* receives object proposals from the RPN of the object detector C1-*b* and classifies the proposals as either known ("in-distribution") or unknown ("out-of-distribution").

At 224, the object classifications from C4-*a* are input to an unknown refinement sub-module C4-*b*. In some instances, the ID/OOD classifier C4-*a* may not precisely differentiate between unknown categories and known categories when there is very little training data. For example, known objects in the foreground can be inadvertently classified as unknown. In order to refine the unknown detection results, only those unknown detections that are classified as background by the object detection sub-module C1-*b* are considered as unknown objects. These unknown objects are then sent downstream to trigger unknown object handling.

Note that the steps 204-224 need not be performed in numerical order, and at least some of the modules C1-C4 can operate in parallel. For example, image 202 can be processed by inputting the image 202 to both the modules C1 and C2 simultaneously. By separating the feature extraction operation in C1 from the uncertainty feature extraction in C2, the anomaly detection process can be performed more quickly and efficiently.

The outputs from the modules C1-C4, including the camera diagnosis result, scene anomaly map, lens anomaly map, and unknown object classifications, are then sent to various downstream modules for different kinds of anomaly handling strategies. Although some of these outputs are used by other modules C1-C4, the outputs can generally be handled by the different downstream modules. Separating the outputs produced by the anomaly detection process 200 enables the downstream modules to operate in parallel and improve the speed with which the vehicle can react. In addition, the anomaly detection process 200 does not rely on a particular camera perception system. In general, a wide variety of perception systems are compatible with the modules C1-C4, as long as the system is able to produce input images 202.

Figure 3:
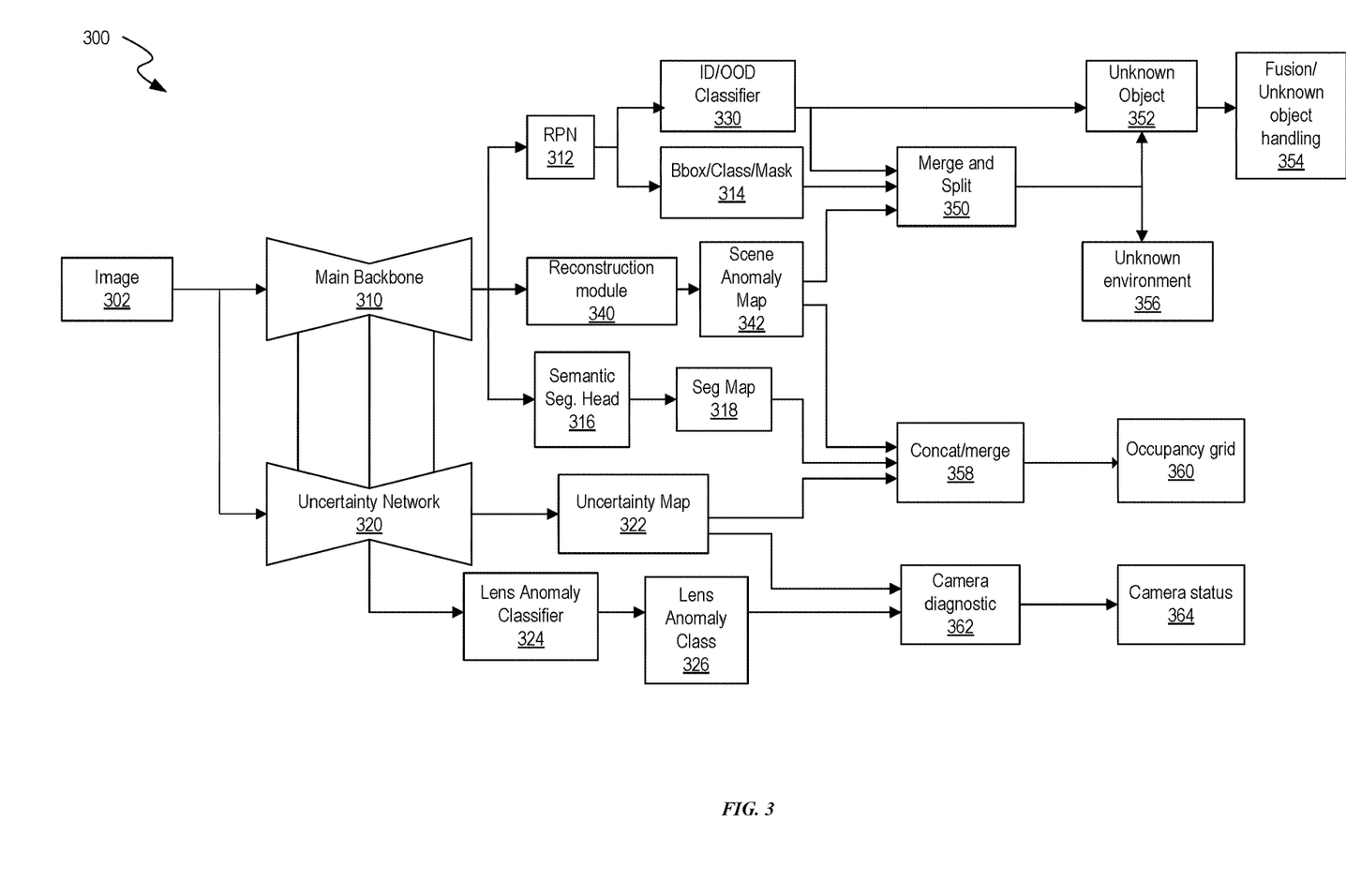
FIG. 3 shows an example framework for anomaly detection.

FIG. 3 shows an example framework 300. The components of the framework 300 perform anomaly detection, such as the process 200 of FIG. 2. Furthermore, at least some components of the framework 300 correspond to the modules C1-C4 shown in FIG. 2. In some embodiments, the framework 300 is implemented as part of the image processing module 165 of FIG. 1.

An image 302 is produced by a vehicle's camera perception system and input into a main backbone 310 and an uncertainty network 320. In some embodiments, the image 302 is input to the main backbone 310 and the uncertainty network approximately simultaneously. The image 302 can be similar to the image 202 of FIG. 2.

The main backbone 310 processes the image 302 and extracts a set of features from the image, similar to the feature extraction sub-module C1-*a* shown in FIG. 2. The set of features produced at the main backbone 310 is used by several components, further described below.

First, the set of features is used by the region proposal network (RPN) 312. The RPN 312 is configured to detect objects in the image 302, predict object bounds, and output one or more proposals. The proposals from the RPN 312 are used by the bounding box module 314. Although termed "bounding box," the bounding box module 314 can be configured to predict a bounding box, class, or mask for the proposed objects. In some embodiments, the RPN 312 and bounding box module 314 collectively correspond to the object detection sub-module C1-*b* of FIG. 2.

The set of features produced by the main backbone 310 is also used by the semantic segmentation head 316. The semantic segmentation head 316 is similar to the semantic segmentation sub-module C1-*c* of FIG. 2 and can categorize each pixel of the image 302 into different categories or classes. Specifically, each pixel can be associated with one or more classification probabilities, each corresponding to different categories. The semantic segmentation head 316 outputs a segmentation map 318 including the classification probabilities of the pixels of the image 302. In some embodiments, the elements 310-318 correspond to the camera perception module C1 of FIG. 2.

Next, the set of features from the main backbone 310 are input into the uncertainty network 320. The uncertainty network 320 extracts features from the image 302, except rather than detect objects, the uncertainty network 320 is trained to extract features associated with uncertainty in the image. Such features may be the result of distortions due to water droplets, glare from a bright light source (e.g., the Sun), or dust accumulated on a camera lens. The uncertainty network 320 can be similar to the uncertainty feature extraction sub-module C2-*a*.

The uncertainty network 320 uses the uncertainty feature map to produce an uncertainty map 322. The uncertainty map 322 includes uncertainty values for the pixels of the image 302. Although not pictured, in some embodiments, the uncertainty network 320 includes an RPN and a semantic segmentation head similar to the RPN 312 and the semantic segmentation head 316, except trained to identify and map regions with high uncertainty. In some embodiments, the uncertainty network 320 includes the uncertainty estimator C2-*b* of FIG. 2.

The uncertainty feature map produced by the uncertainty network 320 is used by a lens anomaly classifier 324 to classify the anomaly. Example classifications are associated with a condition of the lens and include water blur, mud or dirt occlusions, or poor exposure. The lens anomaly classifier 324 is generally similar to the lens anomaly classification sub-module C2-*b* in FIG. 2. The lens anomaly class 326 determined by the lens anomaly classifier 324 is then sent to the camera diagnostic module 362. In some embodiments, the elements 320-326 correspond to the lens anomaly module C2 in FIG. 2.

The camera diagnostic module 362 uses the uncertainty map 322 and the lens anomaly classification 326 to determine a camera status 364 (e.g., of the camera that captured the image 302.) The camera diagnostic module 362 can correspond to the camera diagnosis sub-module C2-*d* of FIG. 2. As described previously, the uncertainty map 322 can include a set of uncertainty values that correspond to each pixel of the image 302. The camera diagnostic module 362 evaluates these uncertainty values according to criteria such as threshold uncertainty values or an amount of time or number of frames that a pixel has a particular uncertainty value. In addition, the number or proportion of pixels having a threshold uncertainty value can be considered (e.g., less than or equal to 10%, 20%, 30%, etc., of the entire image 302.) For example, if a higher proportion of pixels have a higher uncertainty, this can be indicative of an issue with the camera lens.

The criteria used to determine camera status 364, such as the threshold uncertainty value, can be adjusted depending on the camera hardware/software or anomaly class 326. For example, weather conditions such as rain or mud affect the camera lens differently than light-related issues such as exposure. Thus, the proportion of pixels, threshold uncertainty values, or time criteria can be adjusted accordingly.

If the camera diagnostic module 362 determines that the camera status is unhealthy, then the camera status 364 is sent downstream for post-processing, such as to effect a change in the vehicle's behavior. In addition, the camera diagnostic module 362 can also forward the lens anomaly class 326 downstream.

The main backbone 310 also sends its feature map to a reconstruction module 340. In some embodiments, the reconstruction module 340 corresponds to the masking sub-module C3-*a-c* of FIG. 2. The reconstruction module applies a mask to the feature map and then attempts to reconstruct the original feature map using the masked feature map. The masking step can be applied randomly, targeted toward particular areas of the feature map, or a combination of the two. The difference between the original feature map and the reconstructed feature map is used to produce a scene anomaly map 342. For example, regions where the reconstructed feature map differs greatly from the original feature map can be indicative of a scene/environmental anomaly. The determination of a scene anomaly can include identifying clusters of pixels with difference values above a threshold value, for instance. In some embodiments, producing the scene anomaly map 342 includes additional image processing steps, such as foreground subtraction described with reference to C3-*c* in FIG. 2.

To identify object anomalies, the proposals output by the RPN 312 are evaluated by an in-distribution/out-of-distribution (ID/OOD) classifier 330. The ID/OOD classifier can implement a machine-learning model, and its performance depends on the training data used to train the model. Objects that are present in the training data are more likely to be identified as known or ID, and objects that are not in the training data can be classified as unknown or OOD and output as unknown objects 352. The ID/OOD classifier 330 generally corresponds to the object anomaly detector C4 of FIG. 2 and can include the ID/OOD classifier sub-module C-4*a* of FIG. 2. The ID/OOD classifier 330 can also include the unknown refinement sub-module C4-*b*.

After lens, scene, and object anomalies are identified and classified, the anomalies can be used by a variety of downstream modules 350-364 to effect a change in the vehicle's behavior. For example, the camera diagnostic module 362 can determine the status of the camera or lens. If the camera is unhealthy, then the vehicle's perception system can be automatically adjusted to compensate for the unreliable image from the unhealthy camera (e.g., engage a redundant camera, adjust other cameras to cover blind spots, etc.)

Unknown object handling is performed using the object handling module 354. For example, the object handling module can cause the vehicle to adjust speed, stop, or change direction in response to detection of unknown objects. In addition, additional image processing can be performed on the unknown objects, such as integrating multiple unknown objects into one image using image fusion.

Another downstream module includes the merge/split module 350. The merge/split module 350 applies image processing to the object classifications from 330, the object bounding boxes from 314, and the scene anomaly map from 342. In some instances, it may be difficult to distinguish between objects in the foreground and the background environment. The merge/split module 350 performs some further image processing to distinguish between unknown objects 352 and unknown environment 356.

Another example downstream module includes an occupancy grid module 360. An occupancy grid generally includes a map of cells (e.g., a grid), where each cell is mapped to a probability or binary value that indicates the cell's occupancy. The data from the scene anomaly map 342, the segmentation map 318, and uncertainty map 322 are merged (e.g., concatenated) at 358 and used to produce an occupancy grid. The occupancy grid can further be used to effect a change in the vehicle's behavior, for example by predicting locations of other vehicles.

Figure 4:
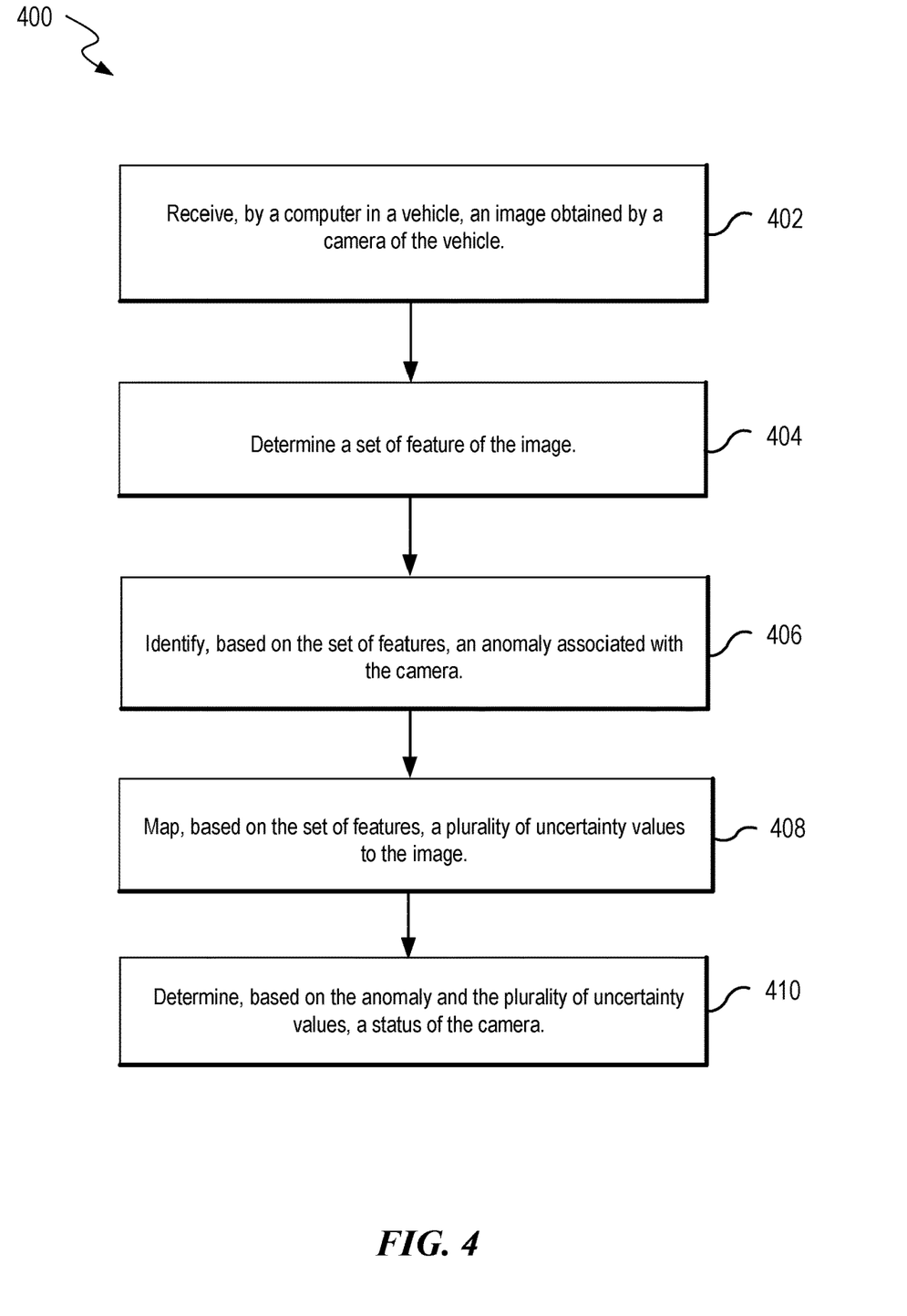
FIG. 4 shows an example flowchart of a process for detecting anomalies related to autonomous vehicle operation.

FIG. 4 shows an example flowchart of a process 400 for detecting anomalies related to autonomous vehicle operation. The process 400 can be performed by a computing system including a processor and a memory, such as the in-vehicle control computer 150 of FIG. 1.

At step 402, an image is received at a computer in a vehicle. The image is obtained by a camera of the vehicle. For example, the image can be received by the in-vehicle control computer 150 and obtained by a camera of the vehicle sensor subsystems 144. The image can correspond to image 202 of FIG. 2 or the image 302 of FIG. 3 and include an optical image, LIDAR image, radar image, or other types of images.

At step 404, a set of features of the image is determined. For example, the step 404 can include feature extraction, object detection, and semantic segmentation. The step 404 can also include extracting features associated with uncertainty in the image from step 402.

At step 406, an anomaly associated with the image is identified based on the set of features determined at step 404. For example, the anomaly can include a lens anomaly, scene anomaly, or object anomaly, as described above. Example anomalies associated with the camera include water, mud, dirt, or camera exposure.

In some embodiments, the image includes an environment external to the vehicle. Anomalies associated with the environment can be determined by first masking a portion of the features from step 404. A reconstructed set of features can then be generated from the masked portion, e.g., by environment anomaly detector C3 or reconstruction module 340. Based on a comparison between the set of features and the reconstructed set of features the environmental anomaly can be identified. For example, an anomaly map (e.g., scene anomaly map 342) can be produced by computing a difference between a first map including the set of features from 404 and a second map including the reconstructed set of features can be computed. Portions of the anomaly map with a large difference, e.g., greater than a threshold, may be more likely to have an environmental anomaly. In some embodiments, a foreground object can be identified in the anomaly map. The foreground object can then be subtracted from the anomaly map.

In some embodiments, an object is identified in the image from step 402. The image can be classified an anomaly based on a determination that the object is outside a set of predefined categories. For example, the predefined categories can correspond to training data used to configure an object detection model, such as in the object anomaly module C4 of FIG. 2 or ID/OOD classifier 330.

At step 408, a plurality of uncertainty values is mapped to the image based on the set of features. In some embodiments, the uncertainty values are mapped on a pixel-by-pixel basis. For example, the uncertainty values can correspond to the uncertainty map 322 of FIG. 3.

At step 410, a status of the camera (e.g., camera status 364) is determined based on the anomaly and the plurality of uncertainty values. For example, the status can indicate a health status of the camera. In some embodiments, determining the status of the camera includes determining, based on the plurality of uncertainty values, a number of pixels that have an uncertainty value greater than a threshold uncertainty value. The status of the camera can then be determined based on the number of pixels. For example, if the number of pixels or proportion of pixels relative to the image is above a threshold, then the camera may be considered unhealthy.

In some embodiments, the vehicle is caused to perform a driving operation based on the status of the camera. For example, the vehicle can be caused to slow down, change lanes, etc. In some embodiments, a redundant camera is engaged based on the status of the camera. For example, if the status of the camera is unhealthy, then the redundant camera can be engaged to maintain perception performance.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware, or firmware.

The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements, and variations can be made based on what is described and illustrated in this disclosure.

What is claimed is:

1. A computer-implemented method comprising:
    receiving, by a computer in a vehicle, an image obtained by a camera of the vehicle;
    determining a set of features of the image;
    identifying, based on the set of features, an anomaly associated with the camera;
    mapping, based on the set of features, a plurality of uncertainty values to the image; and
    determining, based on the anomaly and the plurality of uncertainty values, a status of the camera,
    wherein the image includes an environment external to the vehicle, the method further comprising:
    masking at least a portion of the set of features;
    generating a reconstructed set of features based on the masked portion; and
    based on a comparison between the set of features and the reconstructed set of features, identifying an anomaly associated with the environment.

2. The computer-implemented method of claim 1, further comprising:
    causing the vehicle to perform a driving operation based on the status of the camera; or
    engaging a redundant camera based on the status of the camera.

3. The computer-implemented method of claim 1, wherein the anomaly associated with the camera includes at least one of: water, mud, dirt, or camera exposure.

4. The computer-implemented method of claim 1, wherein the plurality of uncertainty values are respectively mapped to each pixel of the image.

5. The computer-implemented method of claim 1, wherein determining the status of the camera includes:
    determining, based on the plurality of uncertainty values, a number of pixels that have an uncertainty value greater than a threshold uncertainty value; and
    determining the status of the camera based on the number of pixels.

6. The computer-implemented method of claim 1, wherein the comparison is performed by:
    computing a difference between a first map including the set of features and a second map including the reconstructed set of features; and
    producing an anomaly map based on the difference.

7. The computer-implemented method of claim 6, further comprising:
    identifying a foreground object in the anomaly map; and
    subtracting the foreground object from the anomaly map.

8. The computer-implemented method of claim 1, further comprising:
    identifying an object in the image; and
    classifying the object as an anomaly based on a determination that the object is outside a set of predefined categories.

9. A system for autonomous driving comprising:
    a camera coupled to a vehicle;
    a processor; and
    a memory storing instructions, execution of which by the processor causes the system to:
        obtain, by the camera, an image;
        determine a set of features of the image;
        identify, based on the set of features, an anomaly associated with the camera;
        map, based on the set of features, a plurality of uncertainty values to the image; and
        determine, based on the anomaly and the plurality of uncertainty values, a status of the camera,
    wherein the image includes an environment external to the vehicle, the system further caused to:
    mask at least a portion of the set of features;
    generate a reconstructed set of features based on the masked portion; and
    based on a comparison between the set of features and the reconstructed set of features, identify an anomaly associated with the environment.

10. The system of claim 9, further caused to:
    causing the vehicle to perform a driving operation based on the status of the camera; or
    engaging a redundant camera based on the status of the camera.

11. The system of claim 9, wherein the anomaly associated with the camera includes at least one of: water, mud, dirt, or camera exposure.

12. The system of claim 9, wherein the status of the camera is determined by:
    determining, based on the plurality of uncertainty values, a number of pixels that have an uncertainty value greater than a threshold uncertainty value; and
    determining the status of the camera based on the number of pixels.

13. The system of claim 9, wherein the comparison is performed by:
    computing a difference between a first map including the set of features and a second map including the reconstructed set of features; and
    producing an anomaly map based on the difference.

14. A non-transitory computer-readable medium storing instructions, execution of which by a processor of a computing system causes the computing system to:

receive an image obtained by a camera of a vehicle;
determine a set of features of the image;
identify, based on the set of features, a first anomaly associated with the camera;
mask at least a portion of the set of features;
generate a reconstructed set of features based on the masked portion;
based on a comparison between the set of features and the reconstructed set of features, identify a second anomaly associated with an environment external to the vehicle;
identify a third anomaly associated with an object in the image based on a determination that the object is outside a set of predefined categories; and
causing the vehicle to perform a driving operation based on the first anomaly, the second anomaly, or the third anomaly.

15. The non-transitory computer-readable medium of claim 14, the computing system further caused to:
map, based on the set of features, a plurality of uncertainty values to the image; and
determine, based on the first anomaly and the plurality of uncertainty values, a status of the camera.

16. The non-transitory computer-readable medium of claim 14, wherein the comparison is performed by:
computing a difference between a first map including the set of features and a second map including the reconstructed set of features; and
producing an anomaly map based on the difference.

17. The non-transitory computer-readable medium of claim 16, the computing system further caused to:
identify a foreground object in the anomaly map; and
subtract the foreground object from the anomaly map.

18. The non-transitory computer-readable medium of claim 16, the computing system further caused to:
map, based on the set of features, a plurality of uncertainty values to the image; and
produce an occupancy grid based on the plurality of uncertainty values and the anomaly map.

19. The system of claim 9, wherein the plurality of uncertainty values are respectively mapped to each pixel of the image.

20. The system of claim 9, wherein the processor further causes the system to:
identify an object in the image; and
classify the object as an anomaly based on a determination that the object is outside a set of predefined categories.

* * * * *